United States Patent
Iwasa et al.

(10) Patent No.: US 6,904,211 B2
(45) Date of Patent: Jun. 7, 2005

(54) OPTICAL PULSE CODE RECOGNITION DEVICE AND OPTICAL DISTRIBUTOR

(75) Inventors: Izumi Iwasa, Nakai-machi (JP);
Makoto Furuki, Nakai-machi (JP);
Yasuhiro Sato, Nakai-machi (JP);
Minquan Tian, Nakai-machi (JP);
Lyong Sun Pu, Nakai-machi (JP);
Satoshi Tatsuura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 525 days.

(21) Appl. No.: 10/095,693

(22) Filed: Mar. 13, 2002

(65) Prior Publication Data

US 2003/0031439 A1 Feb. 13, 2003

(30) Foreign Application Priority Data

Jul. 27, 2001 (JP) ........................... 2001-228475

(51) Int. Cl.[7] ............................................. G02B 6/04
(52) U.S. Cl. .................................. 385/122; 385/15
(58) Field of Search .......................... 385/122, 15, 16, 385/18

(56) References Cited

U.S. PATENT DOCUMENTS

| 4,776,658 | A | * | 10/1988 | Normandin | 385/28 |
|---|---|---|---|---|---|
| 4,976,507 | A | * | 12/1990 | Udd | 385/16 |
| 5,526,155 | A | * | 6/1996 | Knox et al. | 398/87 |
| 5,539,846 | A | * | 7/1996 | Morikura et al. | 385/24 |
| 5,907,647 | A | * | 5/1999 | Eggleton et al. | 385/28 |
| 6,603,904 | B1 | * | 8/2003 | Shahar | 385/37 |

FOREIGN PATENT DOCUMENTS

| JP | A 11-15031 | 1/1999 |
|---|---|---|
| JP | A 11-282034 | 10/1999 |
| JP | A 2000-314901 | 11/2000 |

* cited by examiner

*Primary Examiner*—Daniel Stcyr
(74) *Attorney, Agent, or Firm*—Oliff & Berridge, PLC

(57) ABSTRACT

An optical pulse code recognition device and an optical distributor recognize multiple bits of a 1 Tbps packet signal as they are, all at one time. A serial signal light emitted from an optical fiber is collimated by a lens and applied onto a mask having a mask pattern. A thin film optical switch increases its optical transmittance when irradiated with a control light, allowing the collimated signal light to transmit through it. When the control light is applied, the transmitted collimated signal light is converted into a parallel signal. The mask pattern has multiple transmission portions allowing one bit of signal light to transmit through and an equal number of non-transmitting portions to block the light, and whether or not a bit pattern of the signal light and the mask pattern match each other is found by detecting a maximum or minimum value of light intensity with a photodetector.

11 Claims, 13 Drawing Sheets

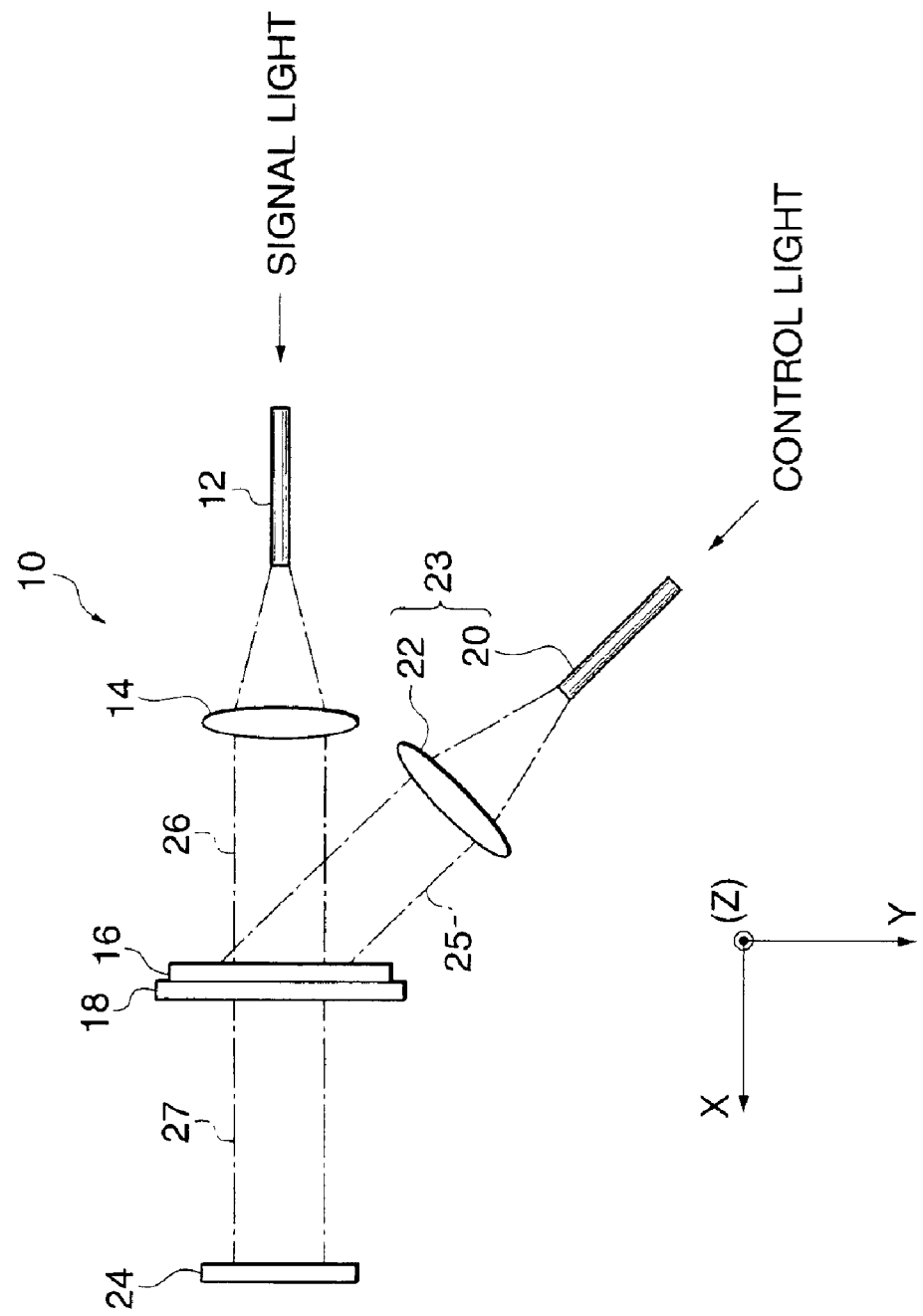

SIGNAL PULSE

MASK

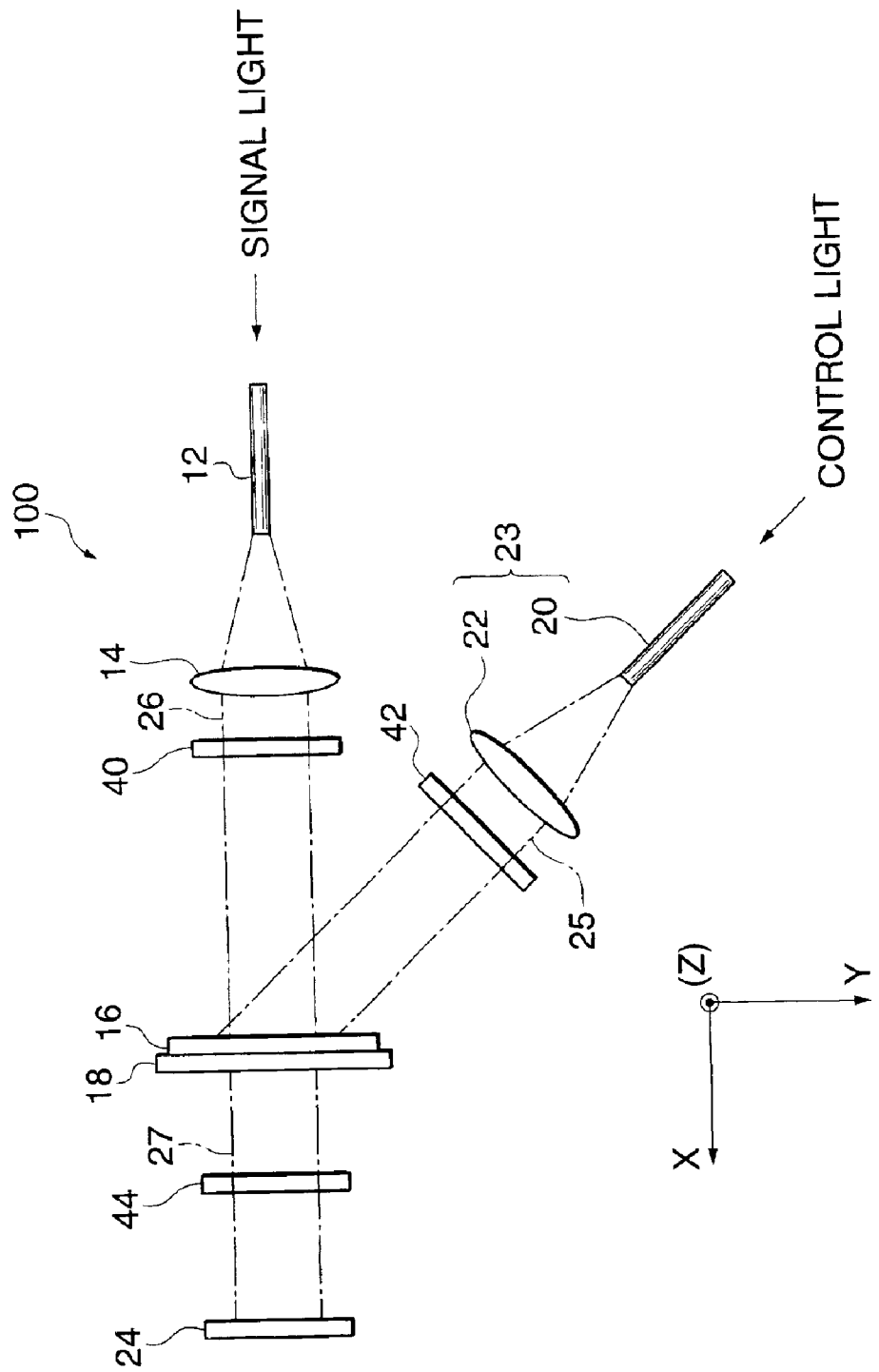

OPTICAL PULSE CODE RECOGNITION DEVICE AND OPTICAL DISTRIBUTOR

BACKGROUND OF THE INVENTION

1. Field of the Invention

The present invention relates to an optical pulse code recognition device and an optical distributor for recognizing all or a portion (for example, header code in packet signals) of optical pulse signals transmitted in optical communication systems.

2. Description of the Related Art

In recent years, an even higher rate of speed is being demanded in data communications in network systems such as on the Internet. This situation has increased the demand for ultra-high speed optical communication systems at rates to 1 Tb/s (1 terabit per second equals to $10^{12}$ bits per second). Possible transmission methods for ultra-high speed optical communication systems at the 1 Tb/s rate are wavelength-division multiplexing, time-division multiplexing and packet signal transmission.

The wavelength-division multiplexing method multiplexes the signal light on multiple channels having bit rates of 10 to 40 Gbps (1 gigabit per second equals to $10^9$ bits per second) by slightly shifting each wavelength and sending it along an optical fiber transmission path, and this signal light is then distributed into multiple channels at the receiver and read out. In this method, the signals prior to multiplexing and after distributing are packet signals.

The time-division multiplexing method multiplexes the signal light of multiple channels having bit rates of 10 to 40 Gbps into a serial signal light along a time axis and sends it along an optical fiber transmission path, and the signal light is then distributed into multiple channels at the receiver and read out. In this method also, the signals prior to multiplexing and after distributing are packet signals. This method has the advantage that the signals can be electronically controlled before multiplexing and after distributing. However, the channel timing must be controlled during multiplexing and distributing.

In contrast, the packet transmission method, namely, the method for transmitting terabit signals (terabit order signals) as packets, can process signals for each packet so that the transmitting and receiving logic is simplified.

When receiving and distributing packet signals, the destination of each packet signal must be recognized and assigned to a transmission path to the destination. Each packet signal therefore is made up of a header (header code) containing address information on the destination, and a packet signal unit (payload) which is information to be sent.

In order to recognize a header code in the prior art, the header code is converted into an electrical code and then electronically recognized.

However, the current upper limit of electronic processing speed is 10 Gbps or 40 Gbps, and the higher bit-rate signals of 100 Gbps or 1 Tbps cannot be processed. Even assuming electronic processing is possible, multi-stage processing would be required so that the header recognition circuit design would be more complex in order to electronically recognize the header code, and the recognition would be delayed.

To resolve this problem, technology is disclosed in Japanese Patent Application No. 2000-245702 for processing and recognizing the header code contained in the packet signal optically. In this technology, the header code is processed as an optical signal, and the header light pulses are compared with the address code bit by bit.

However, the technology disclosed in Japanese Patent Application No. 2000-245702 has a problem that the header light pulses and the address code are compared bit by bit so that a large number of optical logic circuits are required, making the circuit design complex, and collective processing and recognition cannot be performed.

SUMMARY OF THE INVENTION

To resolve the aforementioned problems, the present invention provides an optical pulse code recognition device and an optical distributor capable of directly recognizing multiple bits of 1 Tbps (1 terabit per second) rate packet signals.

An optical pulse code recognition device of the present invention includes: a control light emitter that emits a control light synchronizing with a serial light while having a predetermined period longer than that of the serial signal light, the control light being emitted to form a predetermined angle with the serial signal light; an optical switch unit that contains a nonlinear optical medium, the switch unit being irradiated with the serial signal light and the control light, and transmitting or reflecting the serial signal light while converting it into a parallel signal light at an intersection of the serial signal light and the control light when the nonlinear optical medium is irradiated with the control light; and a detector that detects the parallel signal light from the optical switch unit by a specific arrangement having a combination of a detection part and a non-detection part corresponding to respective signal lights of the parallel signal light.

The optical switch unit is made of a high-speed nonlinear optical medium. In other words, the optical absorbance and the refractive index are changed when a control light pulse is applied to this high-speed nonlinear optical medium. In the optical switch unit, the serial signal light is applied from a signal light emitter. Then, by the nonlinear optical effect, the serial signal light is transmitted through or reflected in the region where the serial signal light and control light intersect and is thereby converted into a parallel signal light.

The control light emitter irradiates the optical switch unit at a predetermined angle with the serial signal light with control light pulses of a predetermined period longer than that of the serial signal light and synchronized with the serial signal light. Then, the region where the control light and serial signal light intersect moves in synchronization with the period of the serial signal light, and a predetermined number of signal pulses are selected from the serial signal light and a parallel signal light is acquired. The specific period of the control light is determined based on the number of parallel signal light pulses and the period of the serial signal light, etc.

The detector detects each signal light of the parallel signal light from the optical switch unit by a specific arrangement of a combination of detection part and non-detection part. This detector can be made up of, for example, a mask having mask patterns made from transmission portions and non-transmission portions corresponding to each signal light of the parallel signal light and a light intensity detector to detect the intensity of signal lights of the parallel signal light transmitting through the transmitting portions.

In this case, the mask pattern is made up of a combination of transmission portions and non-transmission portions corresponding to each signal light of the parallel signal light. In other words, one transmission portion transmits one signal light pulse and one non-transmission portion blocks one signal light pulse. Whether a pattern of the parallel signal light matches (corresponds with) the mask pattern (specific arrangement) is therefore determined by detecting the light intensity according to the number of transmission portions. Thus, the pattern of the parallel signal light can be recognized. Detecting the light intensity according to the number of transmission portions or non-transmission portions is equivalent to the logical operation of exclusive NOR (XNOR) of the parallel signal light patterns and the mask pattern. At this point, the input signal patterns are limited according to specific rules for clear recognition and to eliminate ambiguities.

The mask may be eliminated by arranging the light intensity detector to the arrangement of the mask pattern so as to detect the light intensity only at positions corresponding to the mask pattern transmission portions.

By detecting specific patterns from a combination of detection and non-detection of each signal light from the parallel signal light, each signal light of the parallel signal light can be recognized at high speed with a simple device structure, all at one time.

The mask may contain multiple plural mask patterns arrayed in a direction perpendicular to a arranging direction of each signal light of the parallel signal light, and the light intensity detectors having plural intensity detecting portions each corresponding to each mask pattern of the plural different mask patterns.

The number of transmission portions may equal to the number of non-transmission portions.

The structure of the optical pulse code recognition device may include: a first polarizer that linearly polarizes the signal light in a predetermined direction; a second polarizer that linearly polarizes the control light in a direction tilting at a predetermined angle from the predetermined direction of the signal light; and an analyzer that detects linear polarization components in a direction perpendicular to the predetermined direction of the parallel signal light, in addition to the optical switch unit that generates linear polarization components in a direction perpendicular to the predetermined direction of the signal light linearly polarized by the first polarizer when irradiated with the control light linearly polarized by the second polarizer.

The switch unit may be a thin-film optical switch.

The thin-film optical switch may be a thin film of dye made up of J-aggregates of squarylium dye. Alternatively, the thin-film optical switch may be a thin film of phthalocyanine dye.

The optical switch unit may have a reflecting prism having a light reflecting face at a bottom, the serial signal light is introduced in the prism through another face of the prism and incident on the reflecting face of the prism forming a predetermined angle with the light reflecting face, and also the control light is inputted substantially perpendicular to the light reflecting face from outside of the prism.

The optical pulse code recognition device may also have an optical waveguide unit that subdivides the serial light into multiple serial lights, delays each serial light by a predetermined time, and outputs the multiple serial lights to the optical switch.

The optical distributor of the present invention has the optical pulse code recognition device, a delay unit that holds the serial signal light a predetermined time according to processing time by the optical pulse code recognition device and outputs the delayed serial signal light, and a selector switch that distributes the delayed serial signal light output from the delay unit, based on recognition results from the optical pulse code recognition device.

The delay unit holds the serial signal light a predetermined time according to the optical pulse code recognition device processing time and outputs it. This delay time is determined by the number of collectively recognized parallel signal light pulses and a cycle of the serial signal light, etc.

The selector switch distributes the serial signal output from the delay unit based on recognition results from the optical pulse code recognition device.

A serial signal light can therefore be distributed at high speed by utilizing the optical pulse code recognition device.

BRIEF DESCRIPTION OF THE DRAWINGS

Preferred embodiments of the present invention will be described in detail based on the followings, wherein:

FIG. 1 is a schematic diagram showing the optical pulse code recognition device of the first embodiment;

FIG. 10 is a schematic diagram showing the optical pulse code recognition device of the third embodiment;

DETAILED DESCRIPTION OF THE PREFERRED EMBODIMENTS

Figure 2A:
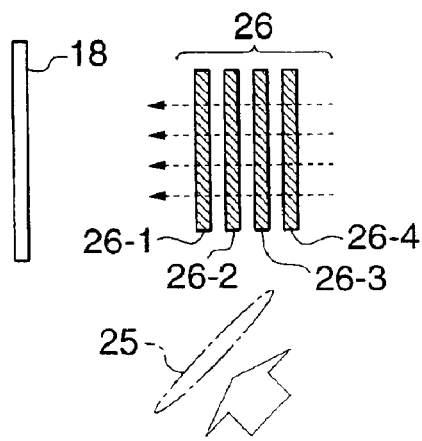
FIGS. 2A to 2E are drawings showing how the parallel signal light is formed by the thin-film optical switch.

The preferred embodiments of the present invention are described in detail below while referring to the drawings.
(First Embodiment)

FIG. 1 is a schematic diagram showing the optical pulse code recognition device 10 of the present invention. As FIG.

1 shows, the optical pulse code recognition device 10 is provided with an optical fiber 12 for emitting a signal light, a lens 14 to collimate a serial signal light of a pulse train emitted from the optical fiber 12, a mask 16 formed in a mask pattern to transmit a portion of the signal light collimated by the lens 14 according to a predetermined pattern, a thin-film optical switch 18 acting as a spatial optical switch that changes the optical transmittance when a control light pulse is applied thereto, a control light emitter 23 containing an optical fiber 20 and a lens 22 to emit a light from a control light generator (not shown in drawing) and a photodetector 24 to detect the signal light transmitted through the thin-film optical switch 18.

The lens 14 transforms a packet code (serial signal) including a terabit-order light signal pulse train, into a collimated signal light 26 spreading on a plane perpendicular to the direction of propagation (travels as a plane with respect to the direction of propagation) and also having a constant cross-sectional area. In other words, when the light pulse signal emitted from the optical fiber 12 spreads during emission and reaches the lens 14, it is formed into the collimated signal light 26. This structure is not a particular prerequisite if the applicable function is provided. In this embodiment, a header code of the packet signal including an optical pulse signal with a repetition period of 1 ps and pulse width of 300 fs is made into the collimated signal light 26 with a beam diameter of 10 mm by the lens 14.

As described in detail later on, a predetermined mask pattern is formed on the mask 16.

The thin-film optical switch 18 acting as the spatial optical switch increases the optical transmittance during input of the control light 25, allowing the collimated signal light 26 to pass through it.

As the thin-film optical switch 18 in the present invention, a switch for spatially converting a serial signal of 1 Tbit/s (terabit per second) or more into a one-dimensional or two-dimensional multichannel parallel signal can be used, for example the switch disclosed in Japanese Published Unexamined Patent Application No. Hei 11-15031. More specifically, the thin-film optical switch is preferably an aggregated dye thin film made from squarylium J-aggregates as disclosed in paragraph No. 0009 through paragraph No. 0019 of Japanese Published Unexamined Patent Application No. Hei 11-282034. The optical switch may also preferably be an aggregated dye film disclosed in paragraph No. 0039 through paragraph No. 0074 of Japanese Unexamined Patent Application No. 2000-314901 and also the optical switch made from an aggregated dye A of Embodiments 1 through 5.

In addition, as materials suitable for the high-speed optical switching film, MQW (multiple quantum well structure) compound semiconductors, phthalocyanine dye, π-conjugate polymer such as polydiacetylene and polythiophene dye, aggregated dye such as squarylium, and thin films of fullerene such as $C_{60}$ and $C_{70}$ may be utilized. In addition, BBO ($\beta$-$BaB_2O_4$), which is a wavelength converting material, may be utilized.

The present embodiment utilized the aggregated dye A (squarylium J-aggregates thin film) disclosed in paragraph No. 0055 of Japanese Unexamined Patent Application No. 2000-314901 as the thin-film optical switch 18. The aggregated dye A is a nonlinear optical medium having a nonlinear optical effect, and the optical transmittance increases when a light pulse having an energy density of 0.1 $J/m^2$ or more is applied thereto.

The control light emitter 23 synchronizes with the collimated signal light pulses 26, and expands and collimates the control light pulses 25 (more specifically, to a beam diameter of 10 mm) on a plane perpendicular to the direction of propagation, and having a period longer than that of the optical pulse signal of the packet signal. The control light 25 is applied on the thin-film optical switch 18 forming a predetermined angle with the collimated signal light 26. In the present embodiment, the energy of a control light pulse 25 is 50 µJ (approximately 0.64 $J/m^2$ in terms of energy density). Also in the present embodiment, the angle formed by the collimated signal light 26 and the control light 25 is 17 degrees. As described in detail later, the "predetermined angle" is determined by factors such as the number of bits of a parallel signal light to be extracted from the optical pulse signal, the surface area of the thin-film optical switch 18, the desired number of channels, the repetition period and wavelength of the optical pulse signal (or collimated signal light 26) and control light 25, and the beam diameter of the collimated signal light 26 and control light 25, etc.

The description, "synchronizes with the collimated signal light pulses", indicates that the control light pulse 25 is applied onto the thin-film optical switch 18, at a timing simultaneous with the collimated signal light pulse 26 converted from packet signal light. The control light pulses 25 are set to have a period (repetition period) longer than the collimated signal light pulses 26. For example, when recognizing only a portion (for instance the header code) of the packet signal at one time, the control light 25 need be emitted only when the header code is applied onto the thin-film optical switch 18 so that when the packet length of the packet signal is set as A bits, and the repetition period of collimated signal light pulses 26 is set as B (ps), then the repetition period C will be: C=B×A (ps). When, dividing the entire packet by D bits for recognition, the control light pulses 25 need to be emitted every D bits so that the repetition period E of the control light pulses 25 will be: E=B×D (ps). The wavelength of the control light 25 depends on the type of thin-film optical switch 18 being used, and therefore it should be selected so as to switch the thin-film optical switch 18 effectively.

As described in detail later on, the number of photodetectors 24 is equal to the number of mask patterns formed on the mask 16, and the photodetectors 24 output the detected light intensity as light detection signals.

The method for recognizing the optical pulse code by utilizing the optical pulse code recognition device of the present embodiment is described next. The recognition method in the prior art when the mask 16 is not installed is described first.

When a terabit-order optical pulse signal is emitted from the end of the optical fiber 12, the pulse signal light spreads as it travels. When applied onto the lens 14, it is collimated to the signal light 26 with a beam diameter of 10 mm.

The collimated signal light 26 then travels to irradiate the thin-film optical switch 18. In synchronization with the collimated signal light 26, the control light 25 having a period longer than that of the optical pulse signal of the packet signal and expanding on a plane perpendicular to the direction of propagation also irradiates the optical switch thin film 18 at a predetermined angle from the collimated signal light 26. The collimated signal light 26 selectively transmits through the area of the thin-film optical switch 18 where the control light pulse is applied, forming a parallel signal light 27 of "n" bits (n is a positive integer).

An example of forming a 4-bit parallel signal light is described next while referring to FIG. 2.

The collimated signal light 26 is applied perpendicularly onto the thin-film optical switch 18. The control light 25 collimated in the same way is applied onto the thin-film optical switch 18 from an oblique direction at a predetermined angle θ with the collimated signal light (FIG. 2A).

Figure 2B:
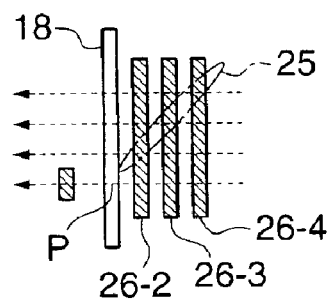
Figure 2C:
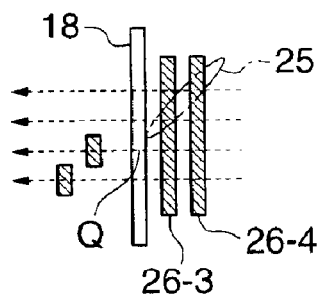
Figure 2D:
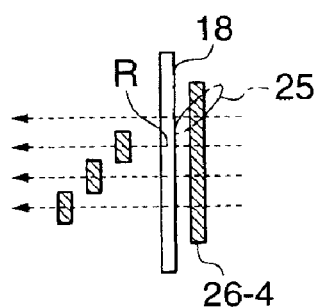
Figure 2E:
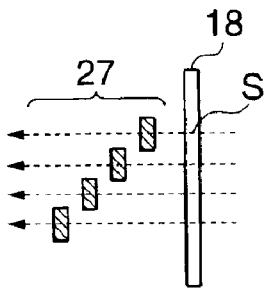

The moment in time at which the control light 25 is applied onto the thin-film optical switch 18 varies according to the position on the thin-film optical switch 18 due to differences in the optical path of the control light 25 from the collimating lens 25 to the thin-film optical switch 18. In other words, the control light 25 first strikes point P as shown in FIG. 2B, and the irradiation point then moves upward as the time elapses as shown in FIG. 2C to FIG. 2E, irradiating point Q, point R and point S in succession at a certain time interval.

When a first pulse 26-1 of the collimated signal light 26 irradiates point P simultaneously with the control light 25, the transmittance at only point P increases by the control light 25 so that only the first pulse 26-1 striking point P transmits through the thin-film optical switch 18. The first pulse 26-1 striking other sections of the thin film optical switch 18 is absorbed because the transmittance is still low. Therefore only the portion of the first pulse 26-1 that strikes point P is extracted (FIG. 2B).

The second pulse 26-2 of the collimated signal light 26 next irradiates point Q simultaneously with the control light 25. Only the portion of the second pulse 26-2 that strikes point Q is extracted (FIG. 2C), the same as with the first pulse 26-1 above. Next, in the same way at point R, only the portion of the third pulse 26-3 that strikes point R is extracted, and a parallel signal light 27 is formed (FIG. 2D). Further, in the same way at point S, only the portion of the fourth pulse 26-4 that strikes point S is extracted, and the parallel signal light 27 is formed (FIG. 2E.).

In the prior art, each bit of the parallel signal light 27 formed in this way was recognized by logic operation using optical logic operation elements each separately provided for the corresponding bit.

The prior art therefore required a complex structure of many optical logic circuits, and collective processing and recognition was impossible.

The structure of the present embodiment allows collective recognition of signal light pulses of several bits by installing a mask 16 on the thin-film optical switch 18.

The mask pattern formed on the mask 16 is described next. The present embodiment explains the case when expressing one bit of information with two transmission bits. In other words, T (True) or F (False) information expressible with 1 information bit is expressed by using 2 transmission bits of signal light.

Figure 3A:
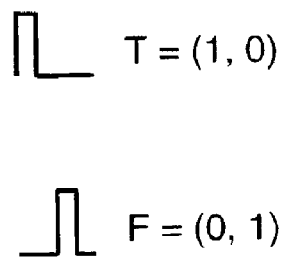
FIG. 3A shows a waveform of the signal pulse.

In the case of the present embodiment, a pair of signal light pulses of "10" indicates T (true) and a pair of signal light pulses of "01" indicates F (false) as shown in FIG. 3A. This method for expressing 1 bit of information with 2 bits is the same as the signal transmission method called the Manchester method. Hereafter, the two transmission bits expressing T=(1,0) and F=(0,1) are referred to as the bit pair for convenience. As shown in FIG. 3A, the value of each bit of signal light is 1 when there is a signal light pulse, and 0 when there is no pulse.

Figure 3B:
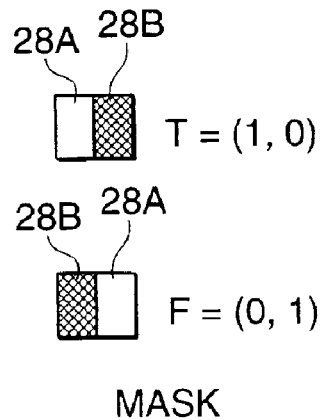
FIG. 3B is a drawing showing a typical mask.

The bit pairs for the mask pattern are as shown in FIG. 3B combinations of a transmission portion 28A to transmit the signal light and a non-transmission portion 28B to block the signal light. In other words, each of the transmission portion 28A and non-transmission portion 28B corresponds to a transmission bit, and the value for each bit of the mask pattern is given as 1 for the transmission portion 28A that transmits the light; and as 0 for a non-transmission portion that blocks the light.

Therefore, a bit pair T ("10") expressing T will transmit through the mask T that expresses T, but a bit pair F ("01") expressing F will not transmit through the mask T. Likewise, a bit pair F will transmit through the mask F that expresses F, but the bit pair T will not transmit through the mask F.

The combination for expressing m bit (m is a positive integer) information with 2 m bits is shown below.

TABLE 1

| m | Bit pair | Transmission bit pattern |
|---|----------|--------------------------|
| 1 | F | 01 |
|   | T | 10 |
| 2 | FF | 0101 |
|   | FT | 0110 |
|   | TF | 1001 |
|   | TT | 1010 |
| 3 | FFF | 010101 |
|   | FFT | 010110 |
|   | FTF | 011001 |
|   | FTT | 011010 |
|   | TFF | 100101 |
|   | TFT | 100110 |
|   | TTF | 101001 |
|   | TTT | 101010 |
| 4 | FFFF | 01010101 |
|   | FFFT | 01010110 |
|   | FFTF | 01011001 |
|   | FFTT | 01011010 |
|   | FTFF | 01100101 |
|   | FTFT | 01100110 |
|   | FTTF | 01101001 |
|   | FTTT | 01101010 |
|   | TFFF | 10010101 |
|   | TFFT | 10010110 |
|   | TFTF | 10011001 |
|   | TFTT | 10011010 |
|   | TTFF | 10100101 |
|   | TTFT | 10100110 |
|   | TTTF | 10101001 |
|   | TTTT | 10101010 |
| . | . | . |
| . | . | . |
| . | . | . |

Figure 4A:
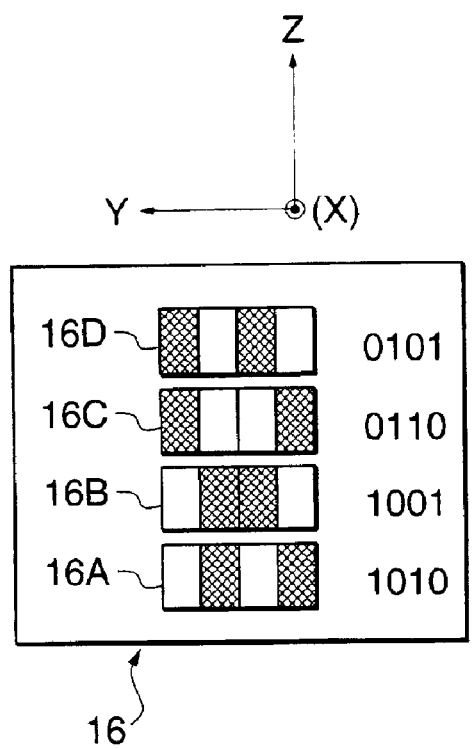
FIG. 4A is a drawing of the mask 16.

There are $N=2^m$ types of patterns for bit pairs of m bits (hereafter, m bit pairs), so an equal number of mask patterns are required to recognize all these patterns. Therefore, N types of mask patterns are formed on the mask 16 according to the number of bits. For example, in the case of 2 bit pairs, four types of mask patterns 16A to 16D are formed along the Z axis as shown in FIG. 4A. Also in this case, a total of four photodetectors 24A to 24D are arrayed along the Z axis to match the positions of the mask pattern 16A to 16D.

In the present embodiment, the mask pitch or the width (length along Y axis in FIG. 4A) of one transmission portion or non-transmission portion is 1 mm, and the length (length along Z axis in FIG. 4A) is slightly less than 2 mm, and each mask pattern is positioned so that the length along the Z axis of the entire mask pattern 16A to 16D is 8 mm. The beam diameter of the collimated signal light 26 is 10 mm so all of the first bits (leftmost bits in FIG. 4A) in the mask patterns 16A to 16D are simultaneously irradiated with the collimated signal light, and then the second to fourth bits (rightmost bits in FIG. 4A) are irradiated in sequence. The collimated signal light 26 irradiates in sequence from left to right on the mask 16, at a speed of 1 mm/ps.

The predetermined angle is set as 17 degrees in this embodiment. This predetermined angle is determined as explained below.

Figure 5:
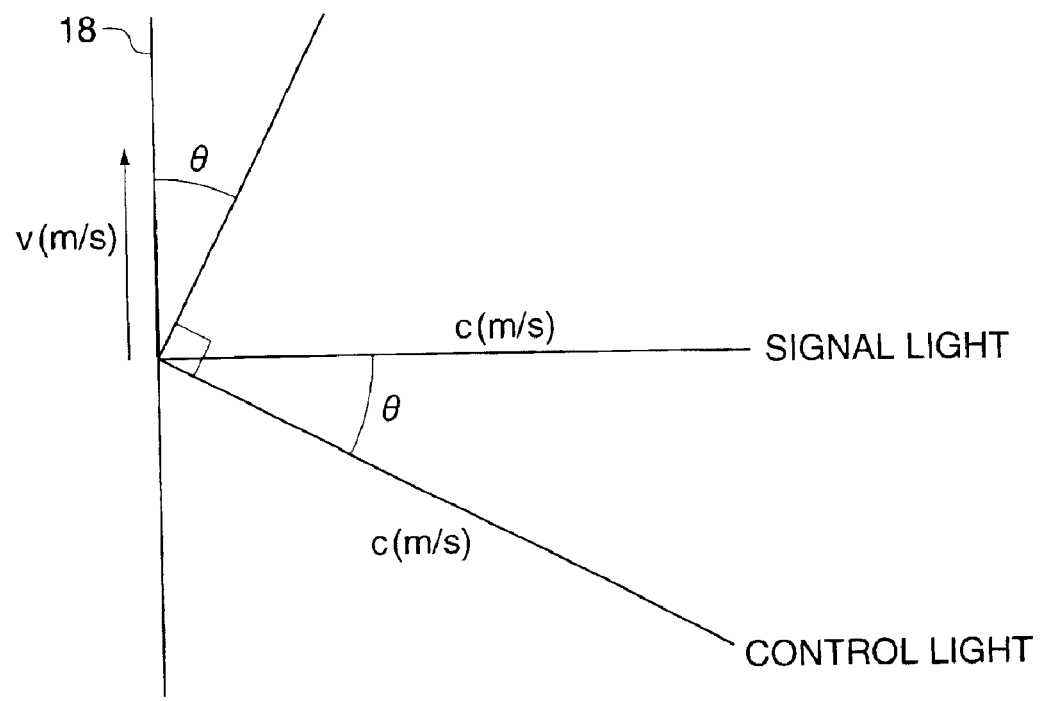
FIG. 5 is a drawing showing the angle formed by the signal light and the control light.

As shown in FIG. 5, when the angle formed by the signal light and the control light is θ, the speed of light is c (m/s), and the speed of the control light on the optical switch thin film 18 is v (mr/s), then the speed v is expressed by the following formula.

$$V = c/\sin\theta \quad (1)$$

When the pulse period of the signal light is T (ps), and the mask pitch (width of 1-bit mask) is d (mm), then the mask pitch d is expressed by the following formula.

$$d = T \cdot v = T \cdot c/\sin\theta \quad (2)$$

Here, in the present embodiment, T=1 (ps), d=1 (mm), C=3×10⁸ (m/s) so that sin θ must be 0.3, and θ therefore equals to approximately 17 degrees.

The photodetectors 24A to 24D and the mask patterns 16A to 16D are roughly equal in size. The light intensity of a signal light transmitting through the mask pattern 16A is detected by the photodetector 24A, and the signal light transmitting through the mask patterns 16B, 16C and 16D is detected in the same way respectively by photodetectors 24B, 24C and 24D and the respective light intensity is detected.

The mask patterns 16A to 16D are combinations of masks T and masks F, having an equal number of "0" bits and "1" bits. Therefore, when the light intensity of a signal light pulse transmitting through a transmission portion of the mask is I, then the light detected by photodetectors 24A to 24D is among the three values 0, I, 2I. Further, when a signal light pattern including 2-bit pairs is applied on the mask patterns 16A to 16D, one photodetector correponding to one mask pattern detects a light intensity of 0, another photodetector corresponding to another mask pattern detects a light intensity of 2I, and two other photodetectors corresponding the two other mask patterns detect a light intensity of I. In other words, there is only one mask pattern for the photodetector detecting a minimum light intensity value of 0, and only one mask pattern for the photodetector detecting a maximum light intensity value of 2I. For example, when the transmission bit pattern is "1010", then the intensity of the signal light transmitting through the mask pattern 16A is 2I, and the intensity of the signal light transmitted through the mask patterns 16B and 16C is respectively I, and the intensity of signal light transmitted through the mask pattern 16D is 0.

The interrelation of m, the light intensity and the mask pattern is shown below in Table 2.

TABLE 2

| m | Light output intensity | Number of mask patterns |
|---|---|---|
| 1 | 0 | 1 |
|   | 1 | 1 |
| 2 | 0 | 1 |
|   | 1 | 2 |
|   | 2I | 1 |
| 3 | 0 | 1 |
|   | 1 | 3 |
|   | 2I | 3 |
|   | 3I | 1 |
| 4 | 0 | 1 |
|   | 1 | 4 |
|   | 2I | 6 |
|   | 3I | 4 |
|   | 4I | 1 |
| . | . | . |
| . | . | . |
| . | . | . |

As shown here, there is only one type of mask pattern that matches the maximum or minimum value of light intensity detected by the photodetector. Therefore, by designating a mask pattern that corresponds to the photodetector having a maximum light intensity value, logic operation of exclusive NOR (XNOR) that the transmission bit pattern and the mask pattern match each other can be performed. Similarly, by designating a mask pattern that corresponds to the photodetector having a minimum light intensity value, logic operation of exclusive OR (XOR) that the transmission bit pattern and the mask pattern have a total mismatch can be performed. In this way, the multiple bits of the transmission bit can be recognized at one time, and a portion of the packet signal, for example the header code, can be recognized at one time. Furthermore, the entire packet signal can each be recognized in a specific number of bits at one time.

Figure 4B:
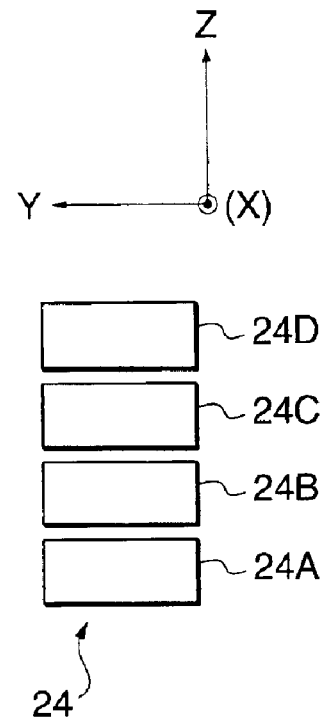
FIG. 4B is a diagram showing the arrangement of the photodetectors.

For example, as shown in FIG. 4, when m equals to 2, the transmission bit pattern can be identified by setting the light intensity threshold Th to 1.5I, for example, and specifying a mask pattern that corresponds to a photodetector detecting a light intensity of 1.5I or more. When the light intensity threshold Th is set to 0.5I, in another example, then an inverted pattern of the transmission bit pattern can be identified by specifying a mask pattern corresponding to the photodetector detecting a light intensity of 0.5I or less.

The optical distributor using the optical pulse code recognition device is described next. A simplified block diagram of the optical distributor 30 is shown in FIG. 6.

Figure 6:
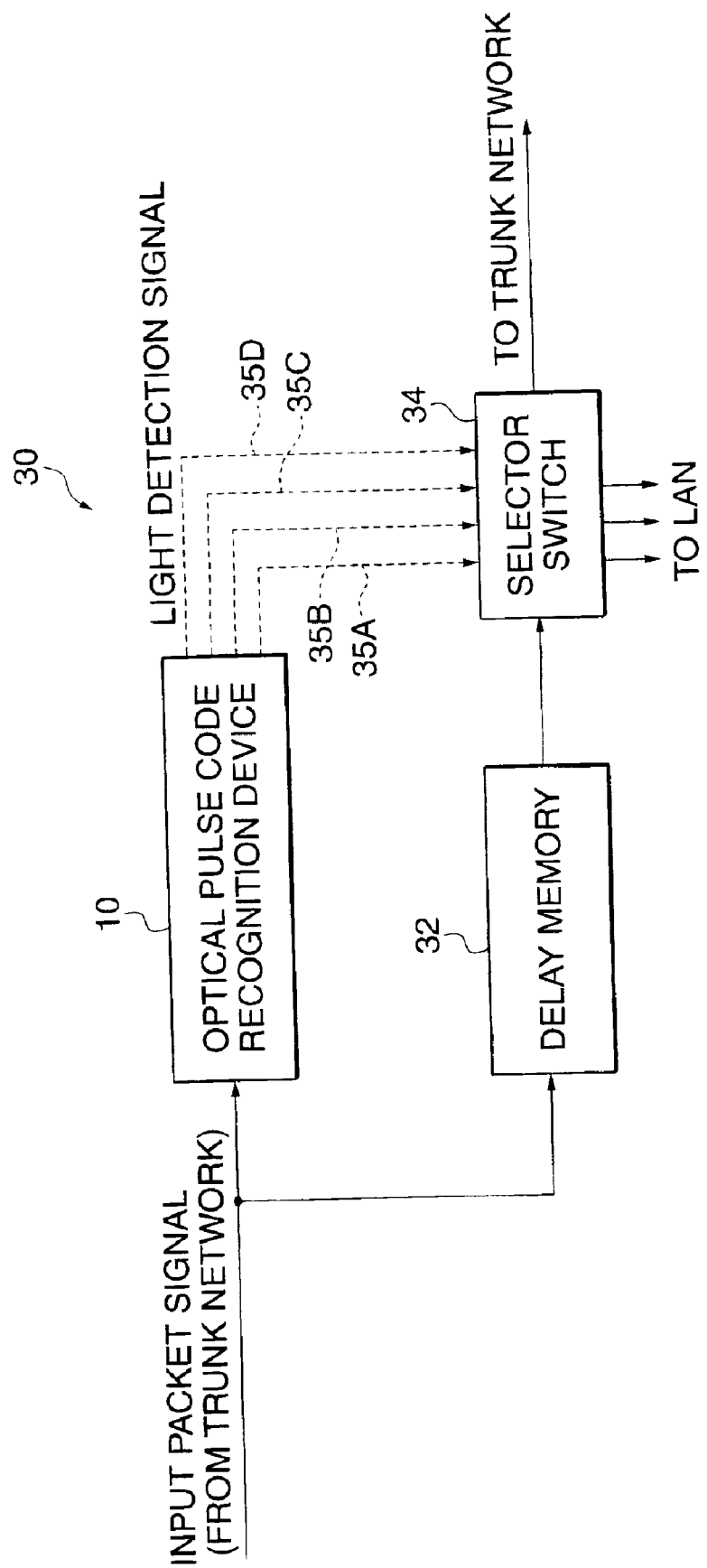
FIG. 6 is a block diagram of the optical distributor.

As shown in FIG. 6, the optical distributor 30 is made up of an optical pulse code recognition device 10, a delay memory 32, and a selector switch 34.

The delay memory 32 outputs the packet signal sent from the trunk network to the selector switch 34 after a predetermined delay time according to the recognition speed of the optical pulse code recognition device 10. For example, as shown in FIG. 4A, when there are 4 bits for each mask pattern, it takes approximately 4 ps that the 4-bit serial signal light is converted into the parallel signal light 27 by the thin-film optical switch 18, detected with the photodetector 24 and the light detection signal is outputted to the selector switch 34, so that 4 ps is set as the packet signal delay time by the delay memory 32. In other words, the delay time is set by the delay memory 32 to nearly match the recognition time in which the optical pulse code recognition device 10 can recognize the signal at one time.

The light intensity detected by the photodetectors 24A to 24D of the optical pulse code recognition device 10 is inputted to the selector switch 34 as the light detection signals 35A to 35D.

Figure 7:
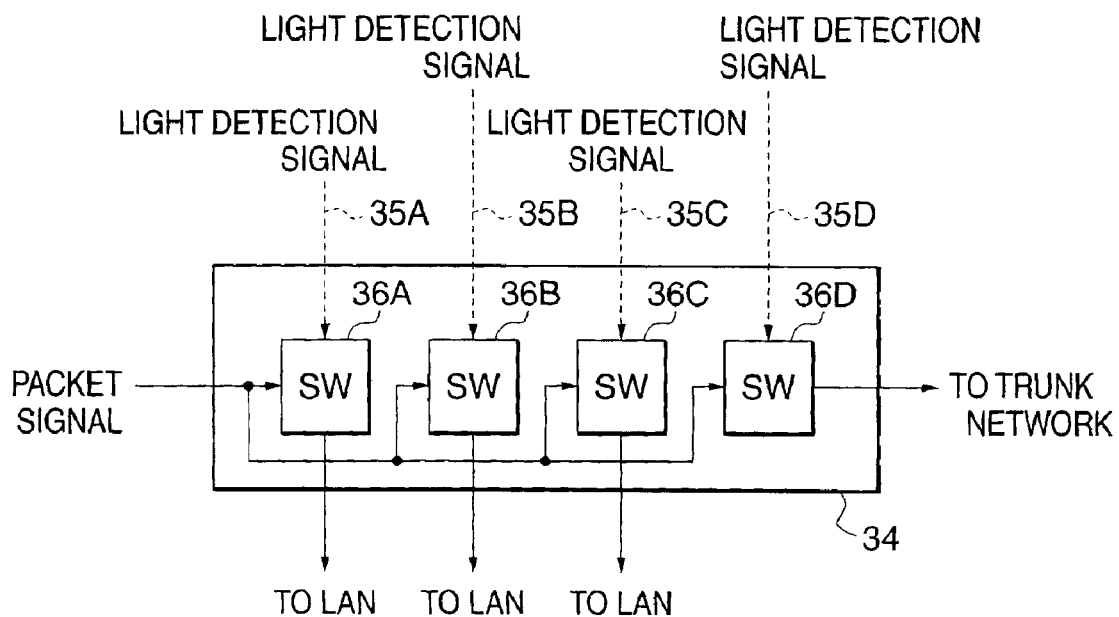
FIG. 7 is a simplified diagram of the selector switch.

As shown in FIG. 7, the selector switch 34 is configured to include the switches (SW) 36A to 36D connected to the photodetectors 24A to 24D, respectively. The switches (SW) 36A to 36D are set with a threshold level of 1.5I, for example, and when the received light detection signal is 1.5I or more, the switch turns on and the packet signal input from the delay memory 32 is sent to its own LAN or to the trunk network. If the light detection signal is less than 1.5I, then the switch turns off.

In the example in FIG. 7, the packet signal is switched to its own LAN when the header code matches any of the mask patterns 16A to 16C. When the header code matches the mask pattern 16D, it is sent to the trunk network. In this way, the optical pulse code recognition device 10 sends a signal for identifying the mask pattern matching the packet signal, to the selector switch 34, and the selector switch 34 distributes the packet signal based on this received signal.

Figure 16:
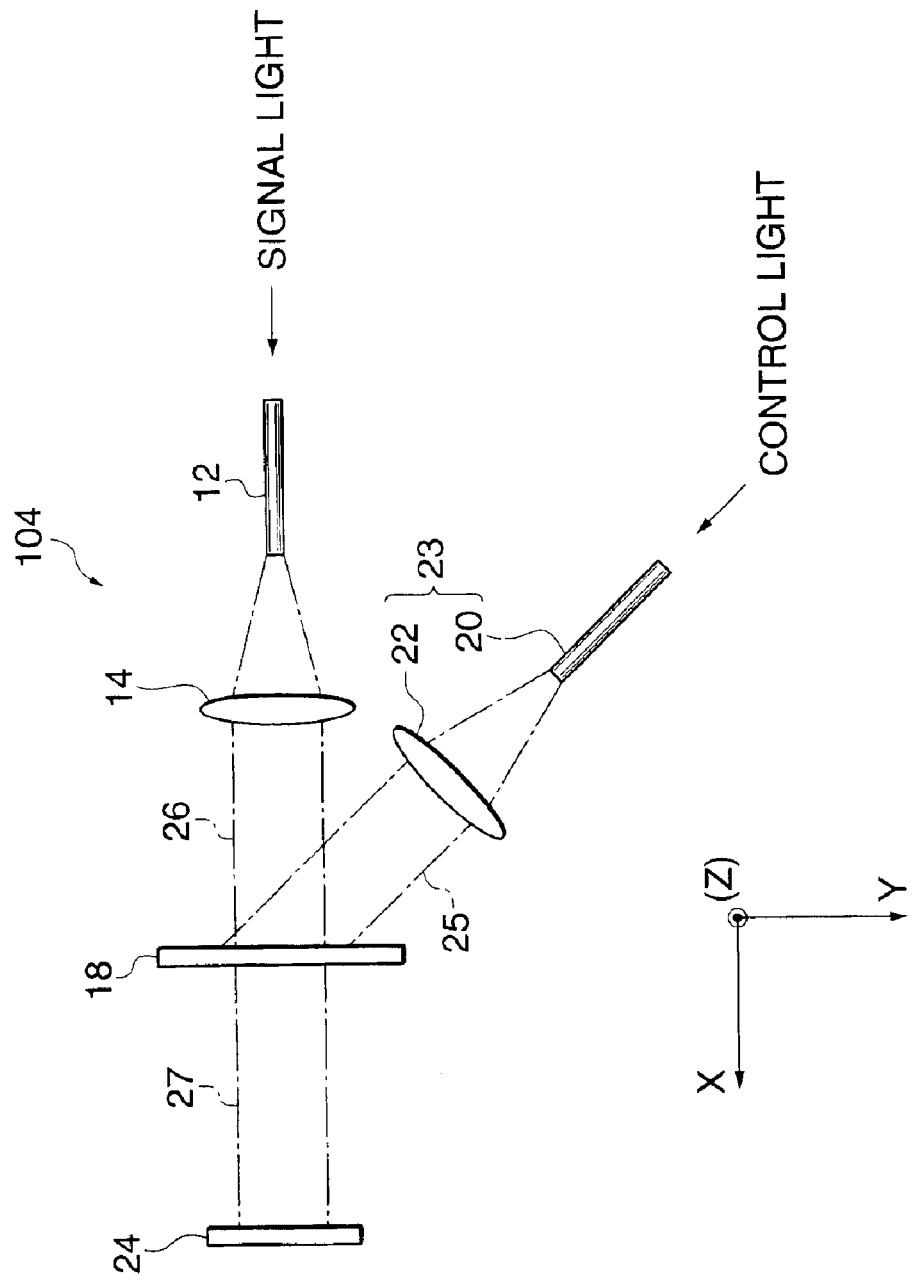
FIG. 16 is a schematic diagram of the optical pulse code recognition device of the related art.

In the present embodiment, as explained above, a mask formed with multiple mask patterns having an equal number of transmission portions and non-transmission portions is installed along with the photodetectors equal in number to the mask patterns. Therefore, the bit pattern of the parallel signal light from the thin-film optical switch 18 can easily be detected by simply detecting the respective light intensities detected by the photodetectors. Therefore, compared with the structure of the optical pulse code recognition device 104 of the prior art having no mask as shown in FIG. 16, multiple bits can be recognized with a simple structure while they are still optical signals.

Figure 8:
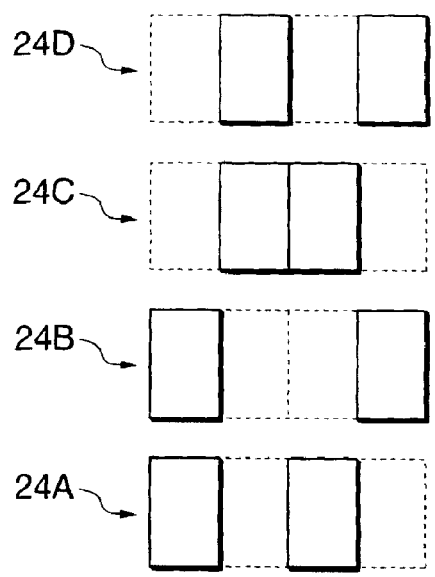
FIG. 8 is a drawing showing another embodiment of the photodetectors.

The present embodiment has a structure of the mask 16 bonded to the thin-film optical switch 18. However, the invention is not limited to this structure, and the mask 16 may be separated from the thin-film optical switch 18, and installed between the thin-film optical switch 18 and the photodetectors 24. The mask 16 may also be installed on the optical path of the collimated control light 25 or the collimated signal light 26. Further, the photodetector 24 can have a shape identical to the mask pattern as shown in FIG. 8, in other words, photodetectors may be installed only at positions corresponding to the transmission portions of the mask pattern so that the mask 16 can be omitted.

In the present embodiment, a pulse train with a repetition period of 1 ps is utilized as the optical pulse signal, and femtosecond optical pulse signals can be recognized in this way. However, this invention is not limited to the order of femtoseconds and is of course also capable of recognizing pulse signals made up of optical pulses having a repetition period of 10 ps or more.

The spatial optical switch of the present invention is not limited to a transmission type for selectively transmitting collimated signal light like the thin-film optical switch 18, and may be reflecting type optical switches for selectively reflecting the collimated signal light. When using a reflecting type switch as a spatial optical switch, the control light should be incident perpendicular to the reflective surface while the collimated signal light is applied onto the spatial optical switch at a predetermined angle with the control light. The reflectance of the spatial optical switch that reflects the collimated signal light 26 is close to 0 when no control light is incident on it, and increases only when the control light is incident on it.

The reflecting type optical switch can be fabricated as an switching thin film formed on the surface of a reflecting material or on the rear side of the transparent substrate with a reflective film on it. For example, the switching thin film itself may be identical to the thin-film optical switch 18 utilized in the present embodiment and this thin film may be formed on the reflective surface, or an strained MQW (multiple quantum well) structure of low-temperature grown Be-doped InGaAs/InAlAs formed on a silicon substrate can also be used.

The optical pulse code recognition device and optical distributor have been described above. However, the above embodiments are merely examples and the invention is not limited by these examples. A structure of the known art may be transferred and/or added in contriving the structure of this invention. The specific numbers in the above embodiments are in all cases provided for the sake of convenience in describing the structure and when embodying the invention, such figures may be set as needed by one skilled in the art according to the desired object and effect. For example, the number of bits of the header code (portion of the optical pulse signal) of the packet signal (optical pulse signal) used for recognition can be set to any desired number of bits. In that case, a parallel signal light may be formed with the required number of bits, and mask patterns matching the number of bits and a photodetector matching the mask patterns may be prepared to recognize the bit pattern of the parallel signal light.

(Second Embodiment)

The second embodiment of the present invention is described next. A different mask pattern is described in the second embodiment. Components identical to the embodiments described previously are assigned with same numbers and their detailed description is omitted.

This embodiment describes the case of expressing N ($=_{2m}C_m$) pieces of information with 2m transmission bits. Mask patterns of 2m bits having m pieces of "1" bits and m pieces of "0" bits are utilized. Examples of bit patterns are shown below in Table 3.

TABLE 3

| 2 m | Bit pattern |
|---|---|
| 2 | 01 |
|   | 10 |
| 4 | 0011 |
|   | 0101 |
|   | 0110 |
|   | 1001 |
|   | 1010 |
|   | 1100 |
| 6 | 000111 |
|   | 001011 |
|   | 010011 |
|   | 100011 |
|   | 100101 |
|   | 101001 |
|   | 110001 |
|   | 110010 |
|   | 110100 |
|   | 111000 |
|   | 001101 |
|   | 011001 |
|   | 001110 |
|   | 011100 |
|   | 101100 |
|   | 100110 |
|   | 010101 |
|   | 101010 |
|   | 010110 |
|   | 011010 |
| . | . |
| . | . |
| . | . |

Figure 9A:
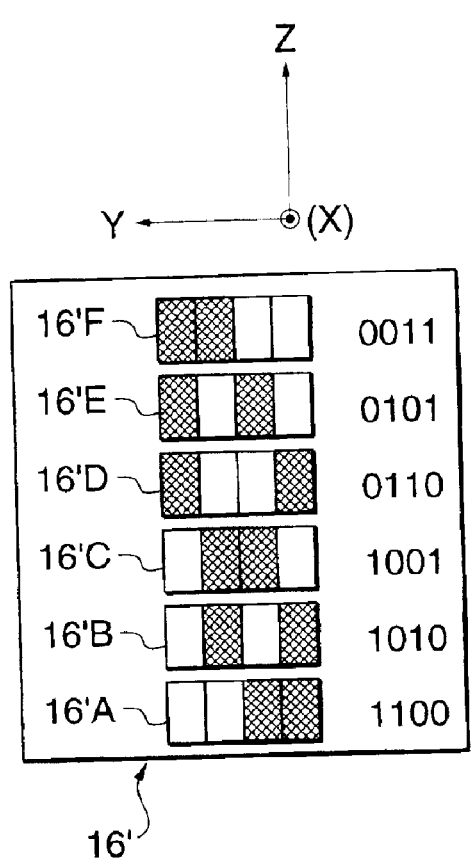
FIG. 9A is a drawing of the mask 16 in the second embodiment.
Figure 9B:
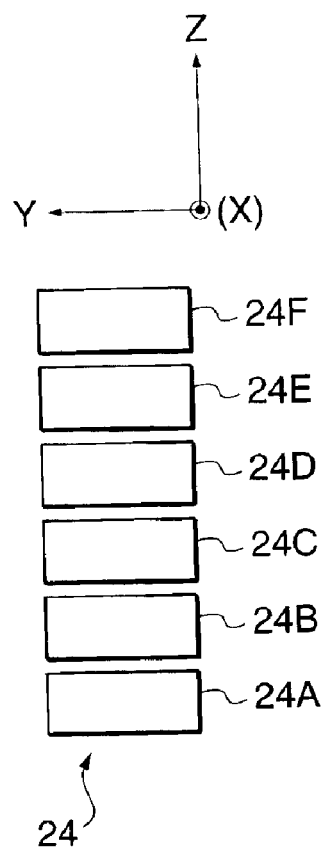
FIG. 9B is a diagram showing the arrangement of the photodetectors in the second embodiment.

The number of bit pattern combinations is expressed by $N=_{2m}C_m$. For example, when 2m=6(m=3), then $N=_6C_3=20$, and 20 bit patterns are present. To recognize all of these patterns, 20 mask patterns are required. Therefore, N types of mask patterns are formed on the mask 16' according to the number of bits, m, for collective recognition. For example when m=2, then 6 types of mask patterns 16'A to 16'F are formed along the Z axis as shown in FIG. 9A. In this case, 6 photodetectors 24A to 24F are arrayed along the Z axis at positions corresponding to the mask patterns 16'A to 16'F as shown in FIG. 9B.

In the present embodiment, the mask pitch or the width (length along Y axis in FIG. 9A) of one transmission portion or non-transmission portion is 1 mm, and the length (length along Z axis in FIG. 9A) is slightly less than 2 mm, and each mask pattern is positioned so that the length along the Z axis of the entire mask pattern 16'A to 16'F is 12 mm. The beam diameter of the collimated signal light 26 is 15 mm so that all of the first bits (leftmost bits in FIG. 9A) in the mask patterns 16'A to 16'F are simultaneously irradiated with the collimated signal light, and then the second to sixth bits (rightmost bits in FIG. 9A) are irradiated in sequence. The collimated signal light 26 irradiates in sequence from left to right on the mask 16, at a speed of 1 mm/ps.

The photodetectors 24A to 24F and the mask patterns 16'A to 16'F are roughly equal in size. The light intensity of signal light transmitting through the mask pattern 16'A is detected by the photodetector 24'A, and the signal light transmitting through the mask patterns 16'B to 16'F is detected in the same way respectively by photodetectors 24B to 24F and the respective light intensity is detected.

The mask patterns 16'A to 16'F here have an equal number of transmission portions corresponding to "1" and non-transmission portions corresponding to "0". Therefore, when the light intensity of a signal light pulse transmitting through a transmission portion of the mask is I, then the light intensities detected by photodetectors 24A to 24F are among the three values 0, I, 2I. Further, when a signal light pattern of 4 bits including two "1" bits and two "0" bits is applied onto the mask patterns 16'A to 16'F, there will be one photodetector corresponding to one mask pattern that detects a light intensity of 0, another photodetector corresponding to another mask pattern that detects a light intensity of 2I, and there will be 4 photodetectors corresponding to 4 remaining mask patterns that detect a light intensity of I. In other words, there is only one mask pattern for the photodetector detecting a minimum light intensity value of 0, and only one mask pattern for the photodetector detecting a maximum light intensity value of 2I. For example, when the transmission bit pattern is "1100", then the intensity of the signal light transmitting through the mask pattern 16'A is 2I, and the intensity of the light transmitted through the mask patterns 16'B to 16'E is each respectively I, and the intensity of signal light transmitted through mask pattern 16'F is 0.

The interrelation of m, the light intensity and the mask pattern is shown below in Table 4.

TABLE 4

| 2 m | Light output intensity | Number of mask patterns |
|---|---|---|
| 2 | 0 | 1 |
|  | 1 | 1 |
| 4 | 0 | 1 |
|  | 1 | 4 |
|  | 2I | 1 |
| 6 | 0 | 1 |
|  | 1 | 9 |
|  | 2I | 9 |
|  | 3I | 1 |
| . | . | . |
| . | . | . |
| . | . | . |

As shown here, there is only one type of mask pattern that matches the maximum or minimum value of light intensity detected by the photodetector. Therefore, by designating a mask pattern that corresponds to the photodetector having a maximum light intensity value, logic operation of exclusive NOR (XNOR) that the transmission bit pattern and the mask pattern match each other can be performed. Similarly, by designating a mask pattern that corresponds to the photodetector having a minimum light intensity value, of logic operation of exclusive OR (XOR) that the transmission bit pattern and the mask pattern have a total mismatch can be performed. In this way, the multiple bits of the transmission bit can be recognized at one time, and a portion of the packet signal, for example the header code, can be recognized at one time. Furthermore, the entire packet signal can each be recognized in a specific number of bits at one time.

In the present embodiment, the mask patterns and the transmission bit patterns have the same number of "0" bits and "1" bits. However, the present invention is not limited to this, for example, if the total number of bits is "n", then the number of "1" bits may be m ($1 \leq m \leq n-1$) and the number of "0" bits may be n−m. In this case, the number of mask patterns, N, will be $N = {}_nC_m$.

At this time, the detected light intensity will be m·I or lower depending on how many bits of the parallel signal light match the bit "1" of the mask pattern. In particular, the maximum value of light intensity m·I is obtained only when the parallel signal light matches the mask pattern, thereby resulting in the logic operation of exclusive NOR (XNOR). The bit pattern of the signal light can therefore be simply identified by designating the mask pattern corresponding to a photodetector detecting the maximum light intensity value m·I.

On the other hand, when the number of "0" bits of the mask pattern is m ($1 \leq m \leq n-1$), and the number of "1" bits is n−m, the light intensity will reach a certain value depending on how many bits of the parallel signal light match the bit "1" of the mask pattern. In particular, the minimum light intensity (zero) is obtained only when the parallel signal light and the mask pattern have no match at all, thereby resulting in the logic operation of exclusive OR (XOR). A bit pattern that is the reverse of the signal light bit pattern can therefore be simply identified by designating the mask pattern corresponding to a photodetector detecting the minimum light intensity value (zero).

The optical distributor may have a structure identical to the first embodiment. In other words, the same number of selector switches 34 as the number of mask patterns may be installed.

The present embodiment is capable of recognizing more bit patterns than the first embodiment, and therefore provides a substantial improvement in transmission rate compared to the first embodiment.

(Third Embodiment)

The third embodiment of the present invention is described next. A different configuration of the optical pulse signal recognition device is described in the third embodiment. Components identical to the previous embodiments are assigned with same numbers and their detailed description is omitted.

FIG. 10 is a schematic diagram showing the basic structure of the optical pulse code recognition device of the present embodiment. As shown in FIG. 10, an optical pulse code recognition device 100 has a polarizer 40 interposed between the lens 14 and the mask 16, along the optical path of the collimated signal light 26. A second polarizer 42 is installed on the optical path of the control light 25, between the lens 22 and the mask 16. Further, an analyzer 44 is interposed between the thin film optical switch 18 and the photodetector 24, along the optical path of the parallel signal light 27. Other components of the structure are identical to the previous embodiments so an explanation is omitted.

Figure 11:
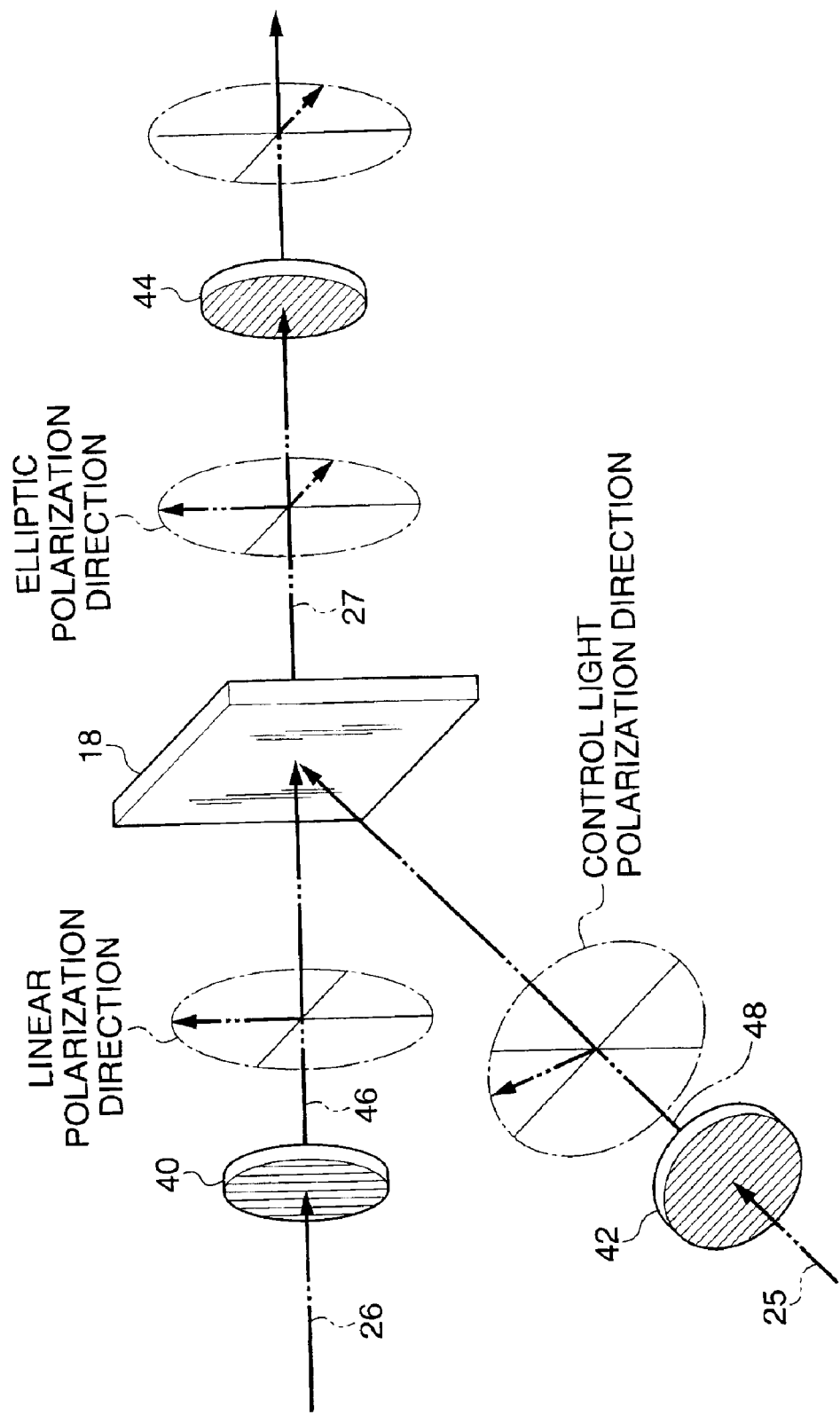
FIG. 11 is a schematic diagram showing how the signal light and control light are polarized by the polarizes and also how the signal light is detected by the analyzer.

FIG. 11 is a schematic diagram showing how the signal light and control light are polarized by the polarizers 40 and 42 and also how the parallel signal light is detected by the analyzer 44. The mask 16 is omitted from FIG. 11 in order to simplify the description.

As shown in FIG. 11, the polarizer 40 extracts the linear polarization component 46 from the collimated signal light 26.

The thin film optical switch 18 is made of a transmitting type nonlinear optical medium that exhibits the optical Kerr effect. As typical materials for the thin film optical switch, squarylium dye, phthalocyanine dye, and fullerene thin films such as $C_{60}$ and $C_{70}$, and also organic super-lattice films containing these organic materials as structural elements can be utilized. In particular, super-lattice films of phthalocyanine and squarylium and super-lattice films of phthalocyanine and compound semiconductor have both a high nonlinear optical effect and fast response characteristics.

From the control light 25, the polarizer 42 extracts the linear polarization component 48 tilted at a predetermined angle (for example, 45 degrees) from the Z axis.

From the parallel signal light 27 that transmitted through the thin film optical switch 18, the analyzer 44 extracts only a specific polarization component in a polarization direction differing 90 degrees from the linear polarization component 46.

When the polarizer 40 is irradiated with the collimated signal light 26, only a linear polarization component in the same direction (vertical direction) as the polarization axis (vertical axis: Z axis) of the polarizer 40 is transmitted, and the linear polarized component 46 is applied onto the mask 16 and the thin film optical switch 18.

When the polarizer 42 is irradiated with the control light 25 from the control light emitter 23, a linear polarization component only in the same direction as the polarization axis of the polarizer 42 (axis tilted 45 degrees from the vertical axis) is transmitted, and the linear polarized component 48 is applied onto the mask 16 and the thin film optical switch 18.

The linear polarized component 48 of the control light is inputted onto the same point of the thin-film optical switch 18, in synchronization with the linear polarized component 46 of the signal light.

Here, "in synchronization with the linear polarized component 46" indicates that the linear polarization component 48 is applied onto the thin film optical switch 18 at a timing simultaneous with at least a portion of the linear polarization component 46 of the collimated signal light 26, which is to be controlled.

As the analyzer 44, a polarizer is mainly utilized. When extracting only a polarization component differing 90 degrees from the polarization direction of the linear polarization component 46, the analyzer 44 is positioned at right angles to the polarization axis of the polarizer 40. The function of the optical switch is described below for the case where the polarization axes of the polarizer 40 and the analyzer 44 are perpendicular.

When the linear polarized component 46 is applied onto the thin film optical switch 18 and the linear polarization component 48 of the control light is not incident on the optical switch thin film 18, the linear polarization component 46 passes through the optical switch thin film 18 without any change in the polarization and arrives at the analyzer 44, but cannot transmit through the analyzer 44 because the polarization direction of the linear polarization component 46 and the polarization axis of the analyzer 44 are perpendicular with each other.

On the other hand, when the linear polarized component 46 is applied onto the thin film optical switch 18 and the linear polarization component 48 of the control light is incident on the thin film optical switch 18 in synchronization, refractive index anisotropy is induced in the thin film optical switch 18 by the optical Kerr effect, and the resultant parallel signal light 27 has a polarization component that is generated in the horizontal direction (along Y axis) by rotation of the polarization plane of the linear polarization component 46. Among the parallel signal light 27, only the polarization component parallel to the polarization axis of the analyzer 44 can then be transmitted through the analyzer 44.

In this way, the optical switch of the present embodiment can control the polarization of the collimated signal light 26 by the presence or absence of the control light 25. The background light can be practically made to 0 (zero) when the control light is not incident so that the on/off ratio can be made extremely large. Further, the wavelength of the signal light can be set to a longer wavelength than the peak absorption wavelength of the material for the thin-film optical switch by making use of the optical Kerr effect.

(Fourth Embodiment)

The fourth embodiment of the present invention is described next. A different configuration of the optical pulse code recognition device is described for the fourth embodiment. Components identical to the previous embodiments are assigned with same numbers and their detailed description is omitted.

Figure 12:
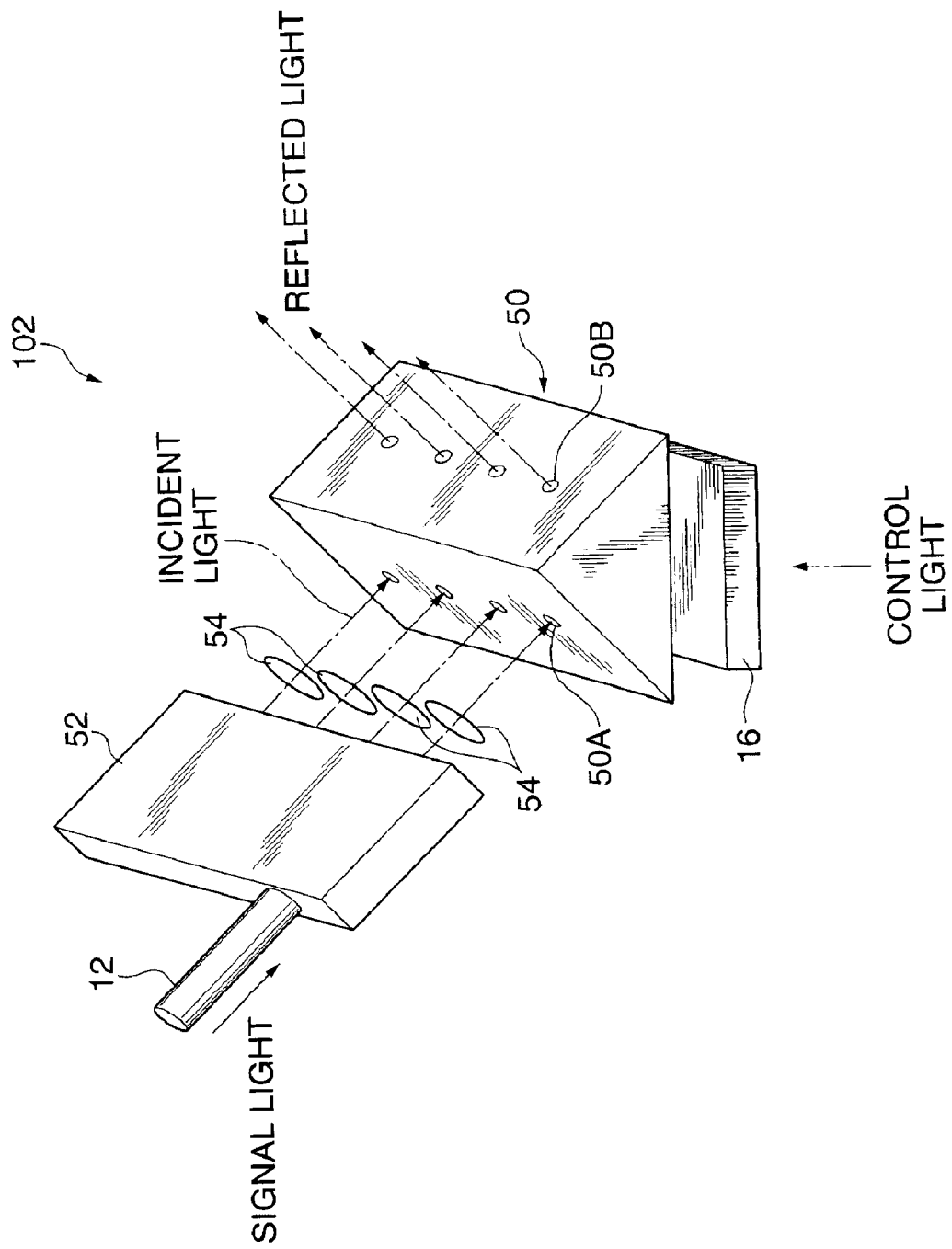
FIG. 12 is a schematic diagram showing the optical pulse code recognition device of the fourth embodiment.

FIG. 12 is a schematic diagram showing the basic structure of an optical pulse code recognition device 102 of the present embodiment. As shown in FIG. 12, the optical pulse code recognition device 102 has an optical right-angle prism 50 as a component and the light-reflecting face is formed on the bottom of the optical right-angle prism. A mask 16 is installed on the light-reflecting face at the bottom surface of the optical right-angle prism 50, and the control light 25 is applied through the mask upon the light-reflecting face. Though not shown in FIG. 12, photodetectors 24 are installed on the light output side of a light emission part 50B from which the reflected light of the optical right-angle prism 50 is emitted.

Figure 13:
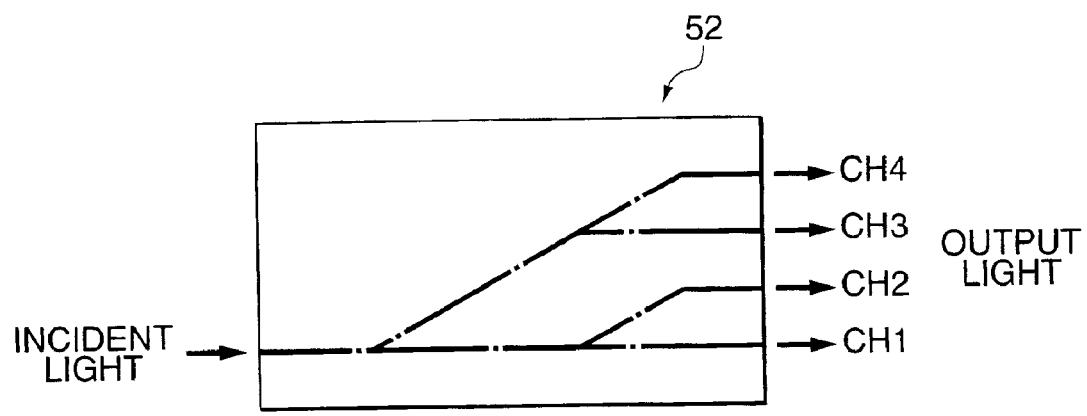
FIG. 13 is a diagram showing the optical waveguides formed in the optical waveguide element.

An optical fiber 12, an optical waveguide element 52 that distributes the signal light conveyed from the optical fiber 12 to multiple channels, and microlenses 54 to shape the signal light output from each channel of the optical waveguide element 52 are installed on the light input part 50A of the optical right-angle prism 50. As shown in FIG. 13, the optical path in each channel of the optical waveguide element 52 is different in length to generate a predetermined delay time among the channels.

The signal light conveyed from the optical fiber 12 is distributed to the multiple (four) channels from the optical waveguide element 52, delayed by delay time τ in each channel, and then output from each channel. The light emitted from each channel of the optical waveguide element 52 is shaped into a beam by the microlens 54, and sequentially input from the optical input part 50A of the optical right-angle prism 50.

The bit rate of the signal light in this embodiment is 100 Gbps. The optical path in each channel of the optical waveguide element 52 is different by a predetermined amount, which is equivalent to 3 mm in a medium with a refractive index of 1, so as to generate a 10-ps delay in the signal light output from each channel. The signal light output from the optical waveguide element 52 is shaped into a beam with a diameter of 1 mm by the microlens, and inputted perpendicularly in 2-mm spacing to the surface of the optical input part 50A. In the present embodiment, the incident angle to the bottom surface of the optical right-angle prism 50 is 44.8 degrees. On the bottom surface of the optical right-angle prism 50, the glass side of a glass substrate having laminations of 30-nm-thick silver thin film and 500-nm-thick squarylium dye thin film is attached. In other words, the light-reflecting face is formed with a silver thin film and a dye thin film on the bottom of the optical right-angle prism 50.

Figure 14:
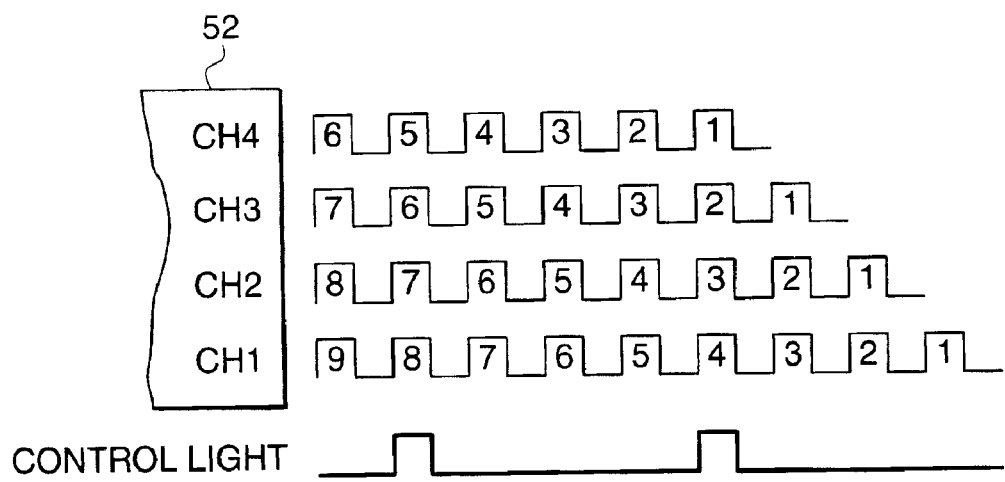
FIG. 14 is a timing chart showing the control light and the signal light emitted from each channel of the optical waveguide element.

In the present embodiment, the repetition period of the signal light is 10 ps, and a delay time of 10 ps is set for each channel of the optical waveguide element 52. Therefore, as shown in FIG. 14, the fourth pulse of the signal light emitted from the first channel CH1 of the optical waveguide element 52, the third pulse of the signal light emitted from the second channel CH2, the second pulse of the signal light emitted from the third channel CH3, and the first pulse of the signal light emitted from the fourth channel CH4, are simultaneously inputted to the optical right-angle prism 50. The control light 25 is inputted from the bottom side of the light-reflecting face, in synchronization with the arrival of these pulses at the light-reflecting face formed on the bottom side of the optical right-angle prism 50. In the present embodiment, the optical system is arranged so that the beam shape of the control light is an elliptical shape of 2 mm by 8 mm, and the pulse width of the control light 25 is 4 ps.

A mask 16 formed with 4-bit mask patterns like that used in the above embodiments may be installed between the control light 25 and the optical right-angle prism 50. The mask pattern may be of one type, and an array of multiple mask patterns may also be installed.

While the control light is incident on the light-reflecting part, the reflectance of the light-reflecting part increases from 1% to 20% due to changes in the refractive index of the squarylium dye thin film. The signal light is therefore reflected at the light-reflecting part, and emitted from the light emission part 50B. Recognition of the signal light is the same as described in the above embodiments, so a description is omitted.

For example, when a delay time of 25 ps is set for each channel of the optical waveguide element 52, a 40-Gbps packet signal can be recognized. Although a 40-Gbps packet signal can be processed electrically, this embodiment allows a simple structure and high-speed processing because the optical signal can be processed as it is.

The explanation of the present embodiment describes a reflective-type optical switch utilizing a change in the refractive index or absorbance. However, an optical switch utilizing absorption saturation similar to the first and second embodiments, or an optical switch utilizing the optical Kerr effect may be used in combination with the optical waveguide element 52.

Figure 15A:
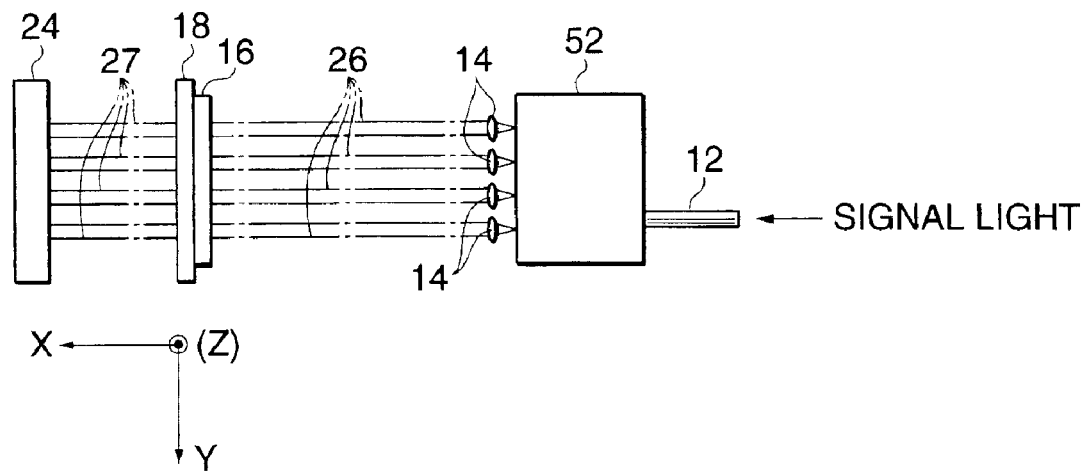
FIGS. 15A and 15B show another example of the optical pulse code recognition device of the fourth embodiment, illustrating the top view in FIG. 15A and the side view in FIG. 15B.
Figure 15B:
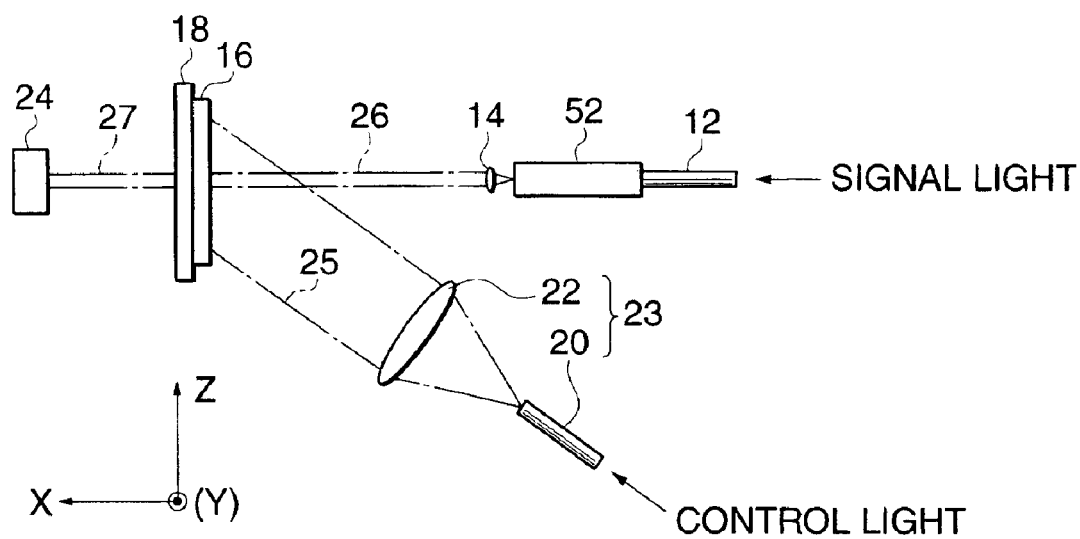

For example, the optical waveguide element 52 may be installed between the optical fiber 12 and multiple (4) lenses 14 as shown in FIG. 15A, and the control light 25 inclined at a predetermined angle is emitted from below at the same timing as that shown in FIG. 14. With this method, 4 bits of the signal light are inputted to the photodetector 24 and the 4 transmission bits can be recognized at one time. The example in FIG. 15 is the case where the mask pattern 16 and the photodetector 24 are of one type. However, multiple patterns can be recognized by enlarging, along the Z axis, the collimated signal light 26 emitted from the optical waveguide element 52 and by arraying multiple mask patterns 16 and photodetectors 24 along the Z-axis as well.

By utilizing the optical waveguide element 52 as the delay circuit in this way in the present embodiment, the delay can be increased compared to the first, second and third embodiments, and the processing flexibility can be improved. Further, by utilizing changes in the refractive index of the squarylium dye thin film material in the light-reflecting part, the wavelength of the signal light can be set to a wavelength longer than the peak absorption wavelength of the squarylium dye thin film.

The present invention as described above therefore renders the effect of collectively recognizing multiple bits of high-speed optical signals in a simple structure.

The entire disclosure of Japanese Patent Application No. 2001-228475 filed on Jul. 27, 2001 including specification, claims, drawings and abstract is incorporated herein by reference in its entirety.

What is claimed is:

1. An optical pulse code recognition device comprising:
   a control light emitter that emits a control light synchronizing with a serial light while having a predetermined period longer than that of the serial signal light, the control light being emitted to form a predetermined angle with the serial signal light;
   an optical switch unit that comprises a nonlinear optical medium, the switch unit being irradiated with the serial signal light and the control light, and transmitting or reflecting the serial signal light while converting the serial signal light into a parallel signal light at an intersection of the serial signal light and the control light when the nonlinear optical medium is irradiated with control light; and
   a detector that detects the parallel signal light from the optical switch unit by a specific arrangement having a combination of a detection part and a non-detection part corresponding to respective signal lights of the parallel signal light.

2. The optical pulse code recognition device according to claim 1, wherein the detector comprises:
   a mask with a mask pattern consisting of transmitting portions and non-transmitting portions corresponding to respective signal lights of the parallel signal light; and
   a light intensity detector that detects an intensity of signal lights of the parallel signal light transmitting through the transmitting portions.

3. The optical pulse code recognition device according to claim 2, wherein the mask comprises a plurality of different mask patterns arrayed in a direction perpendicular to an arranging direction of each of the signal lights of the parallel signal light, and the light intensity detector has a plurality of intensity detecting portions each corresponding to each of the plurality of different mask patterns.

4. The optical pulse code recognition device according to claim 3, wherein the number of transmitting portions in each mask equals to the number of non-transmitting portions.

5. The optical pulse code recognition device according to claim 1, further comprising:
   a first polarizer that linearly polarizes the signal light in a predetermined direction;
   a second polarizer that linearly polarizes the control light in a direction tilting a predetermined angle from the predetermined direction; and
   an analyzer that detects linear polarization components in a direction perpendicular to the predetermined direction of the parallel signal light,
   wherein the optical switch unit generates linear polarization components in a direction perpendicular to the predetermined direction of the signal light linearly polarized by the first polarizer when irradiated with the control light linearly polarized by the second polarizer.

6. The optical pulse code recognition device according to claim 1, wherein the optical switch unit is a thin film optical switch.

7. The optical pulse code recognition device according to claim 6, wherein the thin film optical switch is a thin film of a dye comprising J aggregates of squarylium dye.

8. The optical pulse code recognition device according to claim 6, wherein the thin film optical switch is made from phthalocyanine dye.

9. The optical pulse code recognition device according to claim 1, wherein the optical switch unit contains a reflective prism having a light reflecting face at a bottom, the serial signal light being incident on the reflecting face of the prism through the prism at a predetermined angle with the light reflecting face, and also the control light entering substantially perpendicularly into the light reflecting face.

10. The optical pulse code recognition device according to claim 1, further comprising an optical waveguide unit that subdivides the serial signal light into multiple serial signal lights, delays each serial signal light by a predetermined time, and outputs each serial signal light to the optical switch.

11. An optical distributor comprising:

an optical pulse code recognition device, the optical pulse code recognition device including:

- a control light emitter that emits a control light synchronizing with a serial light while having a predetermined period longer than that of the serial signal light, the control light being emitted to form a predetermined angle with the serial signal light;
- an optical switch unit that comprises a nonlinear optical medium, the switch unit being irradiated with the serial signal light and the control light, and transmitting or reflecting the serial signal light while converting the serial signal light into a parallel signal light at an intersection of the serial signal light and the control light when the nonlinear optical medium is irradiated with control light; and
- a detector that detects the parallel signal light from the optical switch unit by a specific arrangement having a combination of a detection part and a non-detection part corresponding to respective signal lights of the parallel signal light;
- a delay unit that delays the serial signal light by a predetermined time according to processing time by the optical pulse code recognition device and outputs the serial signal light; and
- a selector switch that distributes the serial signal light output from the delay unit, based on recognition results from the optical pulse code recognition device.

* * * * *